United States Patent
Ganapathy et al.

(10) Patent No.: US 11,409,608 B2
(45) Date of Patent: Aug. 9, 2022

(54) PROVIDING HOST-BASED ERROR DETECTION CAPABILITIES IN A REMOTE EXECUTION DEVICE

(71) Applicant: ADVANCED MICRO DEVICES, INC., Santa Clara, CA (US)

(72) Inventors: Shrikanth Ganapathy, Santa Clara, CA (US); Ross V. La Fetra, Santa Clara, CA (US); John Kalamatianos, Boxborough, MA (US); Sudhanva Gurumurthi, Austin, TX (US); Shaizeen Aga, Santa Clara, CA (US); Vilas Sridharan, Boxborough, MA (US); Michael Ignatowski, Austin, TX (US); Nuwan Jayasena, Santa Clara, CA (US)

(73) Assignee: ADVANCED MICRO DEVICES, INC., Santa Clara, CA (US)

( * ) Notice: Subject to any disclaimer, the term of this patent is extended or adjusted under 35 U.S.C. 154(b) by 0 days.

(21) Appl. No.: 17/136,549

(22) Filed: Dec. 29, 2020

(65) Prior Publication Data

US 2022/0206901 A1 Jun. 30, 2022

(51) Int. Cl.
*G06F 11/00* (2006.01)
*G06F 11/14* (2006.01)
*G06F 11/10* (2006.01)

(52) U.S. Cl.
CPC ...... *G06F 11/1435* (2013.01); *G06F 11/1004* (2013.01); *G06F 11/1044* (2013.01)

(58) Field of Classification Search
CPC ......... G06F 11/1435; G06F 2212/7207; G06F 11/1048; G06F 11/1004; G06F 11/1044; G11C 29/42; H03M 13/09
See application file for complete search history.

(56) References Cited

U.S. PATENT DOCUMENTS

| | | | | |
|---|---|---|---|---|
| 5,668,976 | A | * | 9/1997 | Zook ............... H03M 13/00 703/24 |
| 9,569,306 | B1 | * | 2/2017 | Camp ............... G06F 12/0246 |
| 9,710,514 | B1 | * | 7/2017 | Gole ............... G06F 16/245 |
| 9,852,076 | B1 | * | 12/2017 | Garg ............... G06F 3/067 |
| 11,256,574 | B1 | * | 2/2022 | Reddy ............... G06F 11/1464 |

(Continued)

OTHER PUBLICATIONS

Aga et al. "Compute Caches," 2017 IEEE International Symposium on High Performance Computer Architecture (HPCA), IEEE, 2017, pp. 481-492.

(Continued)

*Primary Examiner* — Loan L. T. Truong

(57) ABSTRACT

Providing host-based error detection capabilities in a remote execution device is disclosed. A remote execution device performs a host-offloaded operation that modifies a block of data stored in memory. Metadata is generated locally for the modified of block of data such that the local metadata generation emulates host-based metadata generation. Stored metadata for the block of data is updated with the locally generated metadata for the modified portion of the block of data. When the host performs an integrity check on the modified block of data using the updated metadata, the host does not distinguish between metadata generated by the host and metadata generated in the remote execution device.

20 Claims, 5 Drawing Sheets

(56) References Cited

U.S. PATENT DOCUMENTS

| | | | | |
|---|---|---|---|---|
| 2005/0114595 | A1* | 5/2005 | Karr | G06F 3/0664 |
| | | | | 711/114 |
| 2006/0010227 | A1* | 1/2006 | Atluri | H04L 67/1097 |
| | | | | 709/217 |
| 2006/0106898 | A1* | 5/2006 | Frondozo | G06F 16/10 |
| 2007/0038915 | A1* | 2/2007 | Alaimo | G06F 3/0686 |
| | | | | 714/758 |
| 2007/0268905 | A1* | 11/2007 | Baker | H04L 49/90 |
| | | | | 370/392 |
| 2009/0259456 | A1* | 10/2009 | Amann | G06F 11/1004 |
| | | | | 703/23 |
| 2011/0040924 | A1* | 2/2011 | Selinger | G06F 11/10 |
| | | | | 711/103 |
| 2011/0296123 | A1* | 12/2011 | Adler | G11C 14/0018 |
| | | | | 711/156 |
| 2014/0019413 | A1* | 1/2014 | Braam | G06F 16/1844 |
| | | | | 707/625 |
| 2014/0279941 | A1* | 9/2014 | Atkisson | G06F 16/2365 |
| | | | | 707/690 |
| 2014/0281176 | A1* | 9/2014 | Cornwell | G06F 11/0778 |
| | | | | 711/155 |
| 2015/0347225 | A1* | 12/2015 | Pawlowski | G06F 11/1072 |
| | | | | 714/768 |
| 2016/0274800 | A1* | 9/2016 | Earhart | G06F 3/0659 |
| 2016/0274803 | A1* | 9/2016 | Earhart | G06F 3/0658 |
| 2016/0274970 | A1* | 9/2016 | Earhart | G06F 3/0659 |
| 2017/0242788 | A1* | 8/2017 | Ahmed | G06F 3/0616 |
| 2017/0329635 | A1* | 11/2017 | Rathke | G06F 30/20 |
| 2017/0351570 | A1* | 12/2017 | Laity | G06F 11/1068 |
| 2018/0053545 | A1 | 2/2018 | Son | |
| 2018/0219562 | A1* | 8/2018 | Lee | G06F 11/1076 |
| 2020/0097422 | A1* | 3/2020 | Benisty | G06F 13/1668 |
| 2020/0394099 | A1* | 12/2020 | Lin | G06F 11/1044 |

OTHER PUBLICATIONS

Duwe et.al "Correction Prediction: Reducing Error Correction Latency for On-Chip Memories," IEEE, International Symposium on High-Performance Computing (HPCA'15), 2015, pp. 463-475.

Geremia. Cyclic Redundancy Check Computation: An Implementation Using the TMS320C54x, Texas Instruments, Application Report SPRA560, Apr. 1999, 35 pages.

Yoon et al. "Virtualized and Flexible ECC for Main Memory," 2010 Proceedings of the Fifteenth International Conference on Architectural Support for Programming Languages and Operating Systems (ASPLOS '10), Mar. 13-17, 2010, Pittsburgh, PA, USA, pp. 1-12.

International Search Report and Written Opinion, PCT/US2021/064632, dated Apr. 7, 2022, 9 pages.

* cited by examiner

PROVIDING HOST-BASED ERROR DETECTION CAPABILITIES IN A REMOTE EXECUTION DEVICE

BACKGROUND

Computing systems often include a number of processing resources (e.g., one or more processors), which may retrieve and execute instructions and store the results of the executed instructions to a suitable location. A processing resource (e.g., central processing unit (CPU)) can comprise a number of functional units such as arithmetic logic unit (ALU) circuitry, floating point unit (FPU) circuitry, and/or a combinatorial logic block, for example, which can be used to execute instructions by performing logical operations on data (e.g., one or more operands). For example, functional unit circuitry may be used to perform arithmetic operations such as addition, subtraction, multiplication, and/or division on operands. Typically, the processing resources (e.g., processor and/or associated functional unit circuitry) may be external to a memory array, and data is accessed via a bus between the processing resources and the memory array to execute a set of instructions. To reduce the amount of accesses to fetch or store data in the memory array, computing systems may employ a cache hierarchy that temporarily stores recently accessed or modified data for use by a processing resource or a group of processing resources. However, processing performance may be further improved by offloading certain operations to a processor-in-memory (PIM) device, in which processing resources may be implemented internal and/or near to a memory, such that data processing is performed closer to the memory location storing the data rather than bringing the data closer to the processing resource for the purpose of computations. A PIM device may save time by reducing and/or eliminating external communications and may also conserve power.

Certain applications have phases of low or no temporal data reuse during which they frequently miss in the cache hierarchy and fetch data from memory. In addition, these phases may also exhibit low computational intensity (ratio of flops/byte). During those phases, energy efficiency and performance drops because data movement is high and the phase is memory bound. Accordingly, these phases are particularly suited for offloading to a PIM device or accelerator. For example, the programmer can provide indications in the application source code that a particular code sequence should be offloaded, or the compiler may make such a determination. The interpretation and orchestration of offloaded instructions must still be performed by the processing resource(s) hosting the application.

DETAILED DESCRIPTION

Figure 1:
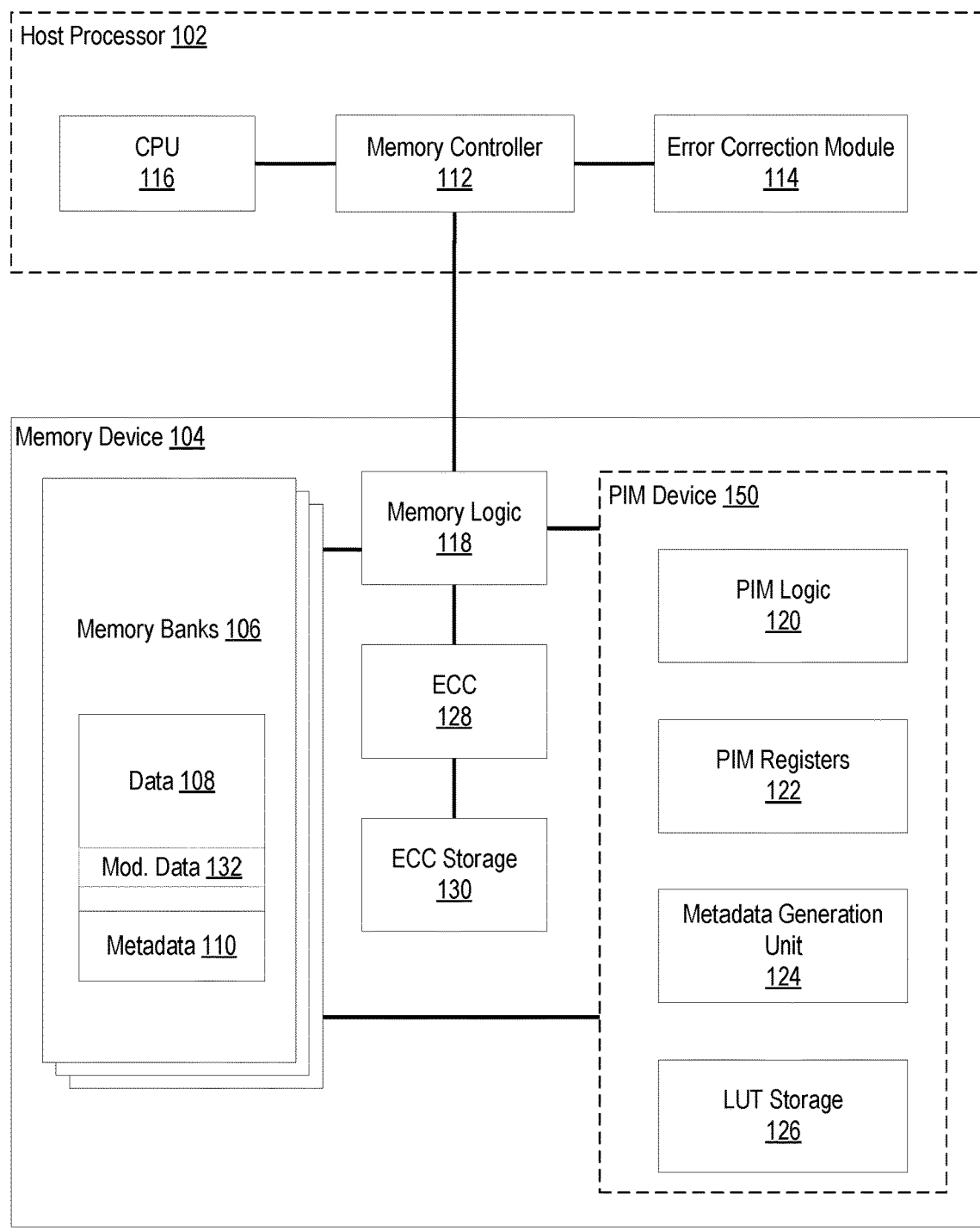
FIG. 1 sets forth a block diagram of an example system for providing host-based error detection capabilities in a remote execution device according to embodiments of the present disclosure.

Processing-in-Memory (PIM) architectures support offloading instructions for execution in or near memory, such that bandwidth on the data link between the processor and the memory is conserved and power consumption of the processor may be reduced. Execution of offloaded instructions by, for example, a PIM device do not require loading data into local central processing unit (CPU) registers and writing data from local CPU storage back to the memory. PIM architectures typically include a PIM-enabled host (e.g., a CPU or graphic processing unit GPU) that is configured to execute PIM instructions for offloading operations to a PIM device. Typically, the PIM device is a memory device that implements compute capability (e.g., PIM logic) within the memory device, although the PIM device may also be tightly coupled to the memory device. For ease of explanation, it is assumed in this disclosure that the PIM device is a PIM-enabled memory device with PIM logic embedded within the memory device that implements the compute capability.

To support error detection for data written to a memory, a host may generate reliability, availability and serviceability (RAS) metadata for the data written to memory. This metadata is typically stored with the data in the memory device and used to perform an error detection check when the data is later retrieved from the memory device. For example, the host may apply an error detection function to the data read from memory to determine if the result of the function matches the metadata. A failure to satisfy this error detection check may indicate a failure to correctly retrieve the data from memory or a corruption of the data itself. A problem arises when that data is modified by a PIM operation because modification of the data may result in the RAS metadata becoming invalid. That is, when PIM-modified data is retrieved by the host, the result of the error detection function applied to the PIM-modified data will likely not match the RAS metadata stored with the data.

One solution to this problem is to mirror the host-based error protection techniques in the memory device. However, this may require all PIM-enabled memory vendors and all PIM-enabled host vendors to agree on using the same error protection techniques, or may require a host to specifically configure the PIM-enabled memory device with the proprietary error detection techniques employed by the host. Very often, host vendors do not want to disclose these proprietary techniques. Thus, mirroring or exactly replicating the host-based error detection techniques in the PIM-enabled memory device may not be a viable solution.

Embodiments in accordance with the present disclosure are directed to providing host-based error detection capabilities in a PIM device without replicating the host-based error detection techniques. Rather, these embodiments update the host-generated metadata, for data that is subsequently modified by a PIM operation, within the PIM device itself. In some embodiments, PIM-generated metadata emulates the metadata generation techniques of the host based on hints, suggestions, or cues received from the host. The host-generated metadata that is updated with the PIM-generated metadata will match bit-by-bit the RAS metadata that would have been generated by the host. Thus, these embodiments provided error detection capabilities for PIM-computed data as if the host itself had generated the RAS metadata for the PIM-computed data.

An embodiment in accordance with the present disclosure is directed to a method of providing host-based error detection capabilities in a remote execution device that includes modifying a block of data stored in a memory device. The method also includes generating, locally, metadata for the modified block of data. The method also includes updating stored host-generated metadata for the block of data with the locally-generated metadata for the modified block of data.

In some implementations, the method also includes storing the modified block of data and the updated metadata. These implementations also include, in response to receiving a request to read the modified block of data from the host, transmitting the modified block of data and updated metadata.

In some implementations, the method also includes storing the block of data and host-generated metadata for the block of data. These implementations also include storing a metadata generation look-up table (LUT) received from a host. Locally generating metadata for the modified portion of the block of data may include utilizing the LUT to emulate host metadata generation for the modified block of data.

In some implementations, the method also includes, in response to receiving a request from the host, reading the block of data and the stored host-generated metadata for the block of data. These implementations also include validating the stored host-generated metadata for the block of data by emulating host metadata generation for the block of data. Validating the stored host-generated metadata for the block of data by emulating host metadata generation for the block of data may include utilizing a look-up table (LUT) to generate metadata for the block of data. Modification of the block of data may be performed without waiting for validation of the stored metadata for the block of data to complete.

In some implementations, the method also includes reading a locally generated error correction code (ECC) information for the stored block of data and metadata from ECC storage and validating the locally generated ECC information prior to modifying the block of data. In some implementations, the method also includes generating ECC information for the modified block of data and the updated metadata and storing the ECC information in the ECC storage.

An embodiment in accordance with the present disclosure is directed to an apparatus for providing host-based error detection capabilities in a remote execution device that includes a memory device and a processing-in-memory (PIM) device coupled to the memory device. The PIM device is configured to modify a block of data. The PIM device is also configured to generate, locally, metadata for the modified block of data. The PIM device is further configured to update stored host-generated metadata for the block of data with the locally-generated metadata for the modified block of data.

In some implementations, the PIM device is further configured to store the block of data and host-generated metadata for the block of data and store a metadata generation look-up table (LUT) received from a host. Generating, locally, metadata for the modified portion of the block of data may include utilizing the LUT to emulate host metadata generation for the modified block of data.

In some implementations, the PIM device is further configured to, in response to receiving a PIM request from a host, read the block of data and the stored host-generated metadata for the block of data. In these implementations, the PIM device is also configured to validate the stored host-generated metadata for the block of data by simulating host metadata generation for the block of data. Validating the stored host-generated metadata for the block of data by emulating host metadata generation for the block of data may include utilizing a look-up table (LUT) to generate metadata for the block of data.

In some implementations, the PIM device is configured to read a locally generated error correction code (ECC) information for the stored block of data and metadata from ECC storage and validate the locally generated ECC information prior to modifying the block of data. In some implementations, the memory device is further configured to generate ECC information for the modified block of data and the updated metadata and store the ECC information in the ECC storage.

An embodiment in accordance with the present disclosure is directed to a system for providing host-based error detection capabilities in a remote execution device that includes a memory device and a host processor coupled to the memory device. The memory device is configured to modify a block of data stored. The memory device is also configured to generate, locally, metadata for the modified block of data. The memory device is further configured to update stored host-generated metadata for the block of data with the locally-generated metadata for the modified block of data.

In some implementations, the memory device is further configured to store the block of data and host-generated metadata for the block of data and store a metadata generation look-up table (LUT) received from a host. Locally generating metadata for the modified portion of the block of data may include utilizing the LUT to simulate host metadata generation for the modified block of data.

In some implementations, the memory device is further configured to, in response to receiving a PIM request from the host, read the block of data and the stored host-generated metadata for the block of data. In these implementations, the memory device is also configured to validate the stored host-generated metadata for the block of data by emulating host metadata generation for the block of data. Validating the stored host-generated metadata for the block of data by emulating host metadata generation for the block of data may include utilizing a look-up table (LUT) to generate metadata for the block of data.

In some implementations, the memory device is further configured to read a locally generated error correction code (ECC) information for the stored block of data and metadata from ECC storage and validate the locally generated ECC information prior to modifying the block of data. In some implementations, the memory device is further configured to generate ECC information for the modified block of data and the updated metadata and store the ECC information in the ECC storage.

Embodiments in accordance with the present disclosure will be described in further detail beginning with FIG. 1. FIG. 1 sets forth a block diagram of an example system 100 for providing host-based error detection capabilities in a remote execution device in accordance with the present disclosure. The example system 100 of FIG. 1 includes a host processor 102 coupled to remote execution device such as a PIM-enabled memory device 104, although readers will appreciate that some embodiments may employ other types of remote execution devices that act on behalf on the host processor 102. The host processor 102 includes at least one CPU 116 that execute instructions including instruction to read and write data to the memory device 104. A memory controller 112 of the host processor 102 receives memory requests generated from the executed instructions and interprets the requests into memory commands that are transmitted to the memory device 104 over a memory channel. Memory interface logic 118 in the memory device 104 receives the commands (and associated data) and fulfills the request by reading or writing data to memory banks 106. In some examples, the memory device may be stacked memory device that include one or more dynamic random access (DRAM) dies stacked on top of a memory interface die and electrically and communicatively coupled to the memory interface die through a number of through-silicon vias (TSVs). For example, the memory device 104 may be a high bandwidth memory (HBM) device. In various examples, the memory device 104 is a remote execution device in that execution logic for executing offload instructions (e.g., PIM instructions) is not part of the CPU 116. For example, the memory device 104 may be implemented on the same chip or in the same package as the host processor 102 while remaining "remote" from the host processor 102 with respect to execution locality. In some examples, the host processor 102 and the memory device 104 of the system 100 are integrated on the same chip (e.g., a system-on-chip (SoC)). In other examples, the system 100 implements a system-in-package (SiP) architecture in which the processor 102 and its components (e.g., as an SoC) are placed on an interposer wafer along with the memory device 104 in the same semiconductor package.

To meet RAS objectives, the host processor 102 may employ error detection techniques when reading and writing data to the memory device 104. One such technique is to generate a linear error correction/detection code for data that is written to memory. This code may be stored as metadata with the data that is written to the memory device 104. When the data is subsequently read from the memory device 104, the same code may be generated for the retrieved data to determine whether the code matches the code that was stored in the metadata with the data. If there is a mismatch, an error may have occurred in reading the data from the memory device. For the example of FIG. 1, it is assumed that the linear error correction/detection code is a cyclic redundancy check (CRC) code.

Consider the example depicted in FIG. 1 where the host processor 102 executes an operation to write data 108 to a memory bank 106 (via memory controller 112 and memory interface logic 118). Prior to issuing the write request for the data 108, a host error correction module 114 applies a function to generate a CRC for the data 108 that is included in metadata 110. The data 108 and metadata 110 are stored in the memory bank 106 as part of the write operation. For example, the host may generate a CRC16 on every M bytes of data. The CRC is generated by dividing the input data by a polynomial number (also called as generator polynomial). In one example, the generator polynomial is N bytes wide as mandated by the CRC code and the remainder of division is the generated CRC. The metadata including the CRC and the M bytes of data are transferred and stored in the memory device.

Continuing the above example, in response to a read request from the host processor 102, the data 108 and metadata 110 are read from the memory bank 106 and transmitted to the host processor 102 (via memory controller 112 and memory interface logic 118). The error correction module 114 verifies the integrity of the received data 108 by applying the same function to generate a CRC for the data 108 and comparing this CRC to the CRC in the metadata 110. If there is a mismatch, a read error or corruption of the data 108 has likely occurred. Readers will appreciate that other suitable error detection techniques may be employed by the error correction module 114, which not limited to a CRC code. Rather, any suitable linear error correction/detection code may be employed.

The memory device 104 may also include local error detection and correction capabilities for determining whether data has been correctly read or written to the memory banks 106. In some examples, the memory device 104 includes an error correcting code (ECC) module 128. For example, the ECC module 128 may be an on-die ECC in that an ECC module 128 is implemented on each die of a stacked die memory device (e.g., an HBM). ECC may be designed by the memory vendor (either proprietary or standards driven) to provide error detection/correction capability to all data (including metadata) sent to and from the host. ECC encoding is performed before new data is written into memory. Checkbits are encoded and stored in an ECC-designated storage area such as an ECC storage 130. Similarly, ECC decoding is performed after data is read from memory by reading both the data and metadata from the memory banks 106 and reading the checkbits from checkbit storage (e.g., from the ECC storage 130). Checkbits calculated for the read data and metadata are compared to the stored checkbits from the checkbit storage. Since the ECC decoding is performed within the memory device 104, the memory device may also provide transparency information to the host processor 102 in the event of errors detected during decoding of the checkbits.

In some examples, the memory device 104 includes a PIM device 150 including PIM logic 120 and PIM registers 122 for carrying out PIM operations (e.g., arithmetic operations) on data store in the memory banks 106. In some implementations, a PIM device 150 may be implemented for each memory bank, while in other implementations a PIM device 150 may be implemented for each memory channel. By way of example and not limitation, the memory device 104 may receive a set of commands to load data from a location in the memory banks into register r0 of a register file (i.e., PIM registers 122), and load data received from the host processor 102 that was computed by the host's CPU 116 into register r1 of the register file. In this example, the PIM logic 120 performs an operation (e.g., a fixed function or static operation stored in a command buffer (not shown) of the memory device) that adds that value in register r1 to the value in register r0 and stores the result in register r0. The result from register r0, referred to as PIM data, is then written back to the location in the memory banks 106. In this example, consider that the memory location in the memory banks 106 is an address for a M byte block of data containing the data 108. As a portion 132 of the data 108 has been modified, a CRC or other linear code in the metadata 110 will likely fail an integrity check when read back to the host processor 102. In the remainder of this disclosure, the portion 132 of PIM-modified data may be referred to as "PIM data" while the unmodified portion of data 108 may be referred to as "non-PIM data."

As can be seen above, a host-generated CRC (or other linear error detection code) may become invalid after PIM operations modify the original data for which the CRC was computed. In order to avoid completely replicating the host error detection techniques in the memory device (which could require all PIM-enabled memory vendors to coordinate error detection techniques with all PIM-enabled host vendors), embodiments in accordance with the present disclosure iteratively construct the CRC of a large block of data using a cache of CRCs of smaller blocks of data.

In some embodiments, the PIM device 150 includes a metadata generator unit 124 to update the metadata 110 for the block of data 108. In some examples, where only part of the data is modified, the CRC needs to be computed only for the modified portion 132 of the data 108. For example, generating the CRC for only a modified portion 132 of the data 108 is faster compared to generating the CRC for the entire M bytes of the data 108. To generate the CRC for only the modified portion, some embodiments utilize hints about the host's error detection technique are received from the host processor 102. In some examples, a host-populated look-up-table (LUT) of CRC values of the most commonly used 16-bit remainders is utilized to update and reconstruct the metadata 110. In these examples, the LUT maybe implemented LUT storage 126 that stores a dictionary of bit positions representing keys and their CRC remainders representing the values. The LUT is then used to compute the CRC without replicating the entire CRC calculation logic of the host processor 102. In some examples, contents of the LUT storage 126 may be protected with parity or ECC. In some implementations, the host processor 102 populates the LUT storage 126 either through memory mapped instructions or at boot time as a part of the power-on self-test (POST) sequence. The generation of metadata locally within the memory device 104 for data modified as part of a PIM operation will be described in additional detail below.

Figure 2:
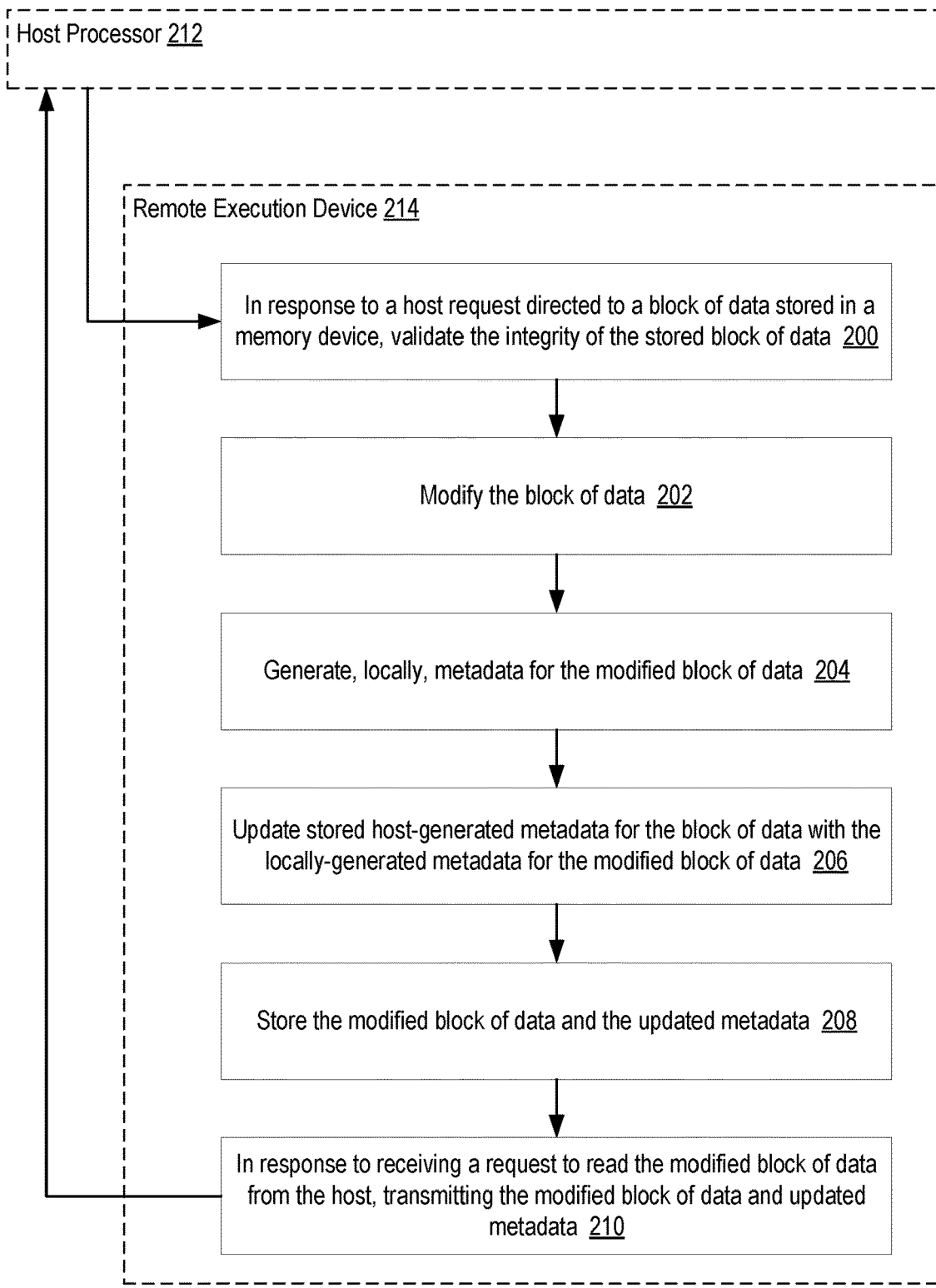
FIG. 2 sets forth a flow chart illustrating an example method of providing host-based error detection capabilities in a remote execution device in accordance with embodiments of the present disclosure.

For further explanation, FIG. 2 sets forth a flow chart illustrating an example method for providing host-based error detection capabilities in a remote execution device in accordance with the present disclosure. The example depicted in FIG. 2 includes a remote execution device 214 such as the PIM-enabled memory device 104 depicted in FIG. 1, an accelerator, or other device that executes operations on behalf of a host system. The example depicted in FIG. 2 also includes a host processor 212 similar in configuration to the host processor 102 depicted in FIG. 1. The example method of FIG. 2 includes, in response to a host request directed to a block of data stored in a memory device, validating 200 the integrity of the stored block of data. In some examples, validating 200 the integrity of the stored block of data is carried out by the remote execution device 214 receiving a command to modify data stored in a memory device, comparing stored error detection metadata associated with the data to error detection metadata generated for the data in response to the request, and verifying the stored metadata matches the generated metadata.

The method of FIG. 2 also includes modifying 202 the block of data. In some examples, modifying 202 the block of data is carried out by the remote execution device 214 loading data from a memory bank (e.g., memory bank 106 in FIG. 1) into a register (e.g., a register 122 in FIG. 1) of the remote execution device 214. In these examples, modifying 202 the block of data is further carried out by executing, in computational logic (e.g., PIM logic 120 in FIG. 1) one or more operations that modifies at least a portion of the data in the register. For example, the operations may be arithmetic or logical operations executed in an arithmetic logic unit (ALU) in the PIM logic.

The method of FIG. 2 also includes generating 204, locally, metadata for the modified block of data. In some examples, generating 204, locally, metadata for the modified block of data is carried out by a metadata generation unit (e.g., metadata generation unit 124 in FIG. 1) generating metadata for the portion of the block of data that was modified by the operation(s) such that the metadata for the modified portion of data that is generated within the remote execution device 214 is recognizable as if it were metadata generated by the host processor 212. In these examples, the metadata for the block of data includes a linear error detection code value (e.g., a CRC value). The specific function of linear error detection code used by the host processor 212 to generate the check value is unknown to the memory device 214, as previously discussed, therefore the memory device 214 is unable to exactly replicate the metadata generation process used by the host processor 212. Instead, the metadata generation unit in the memory device 214 emulates the metadata generation of the host for the modified block of data (or only for portions of data that were modified by the operation(s)). In some examples, the metadata generation unit emulates the metadata generation technique of the host processor by reconstructing a check value for the modified data using partial information about the linear error detection function used by the host processor 212. This partial information may include, for example, the type of function (e.g., CRC), the word encoding width, and mappings of bit strings to check values. Host metadata generation emulation by the metadata generation unit will be described in further detail below.

The method of FIG. 2 also includes updating 206 stored host-generated metadata for the block of data with the locally-generated metadata for the modified block of data. In some examples, updating 206 stored host-generated metadata for the block of data with the locally-generated metadata for the modified portion is carried out by the remote execution device 214 substituting a check value in host-generated metadata with a locally-generated check value for a data word. For example, the remote execution device may be a PIM-enabled memory device carrying out PIM operations on the block of data. In this example, the data word includes data that was modified by the PIM operation(s) (i.e., PIM data). Due to intrinsic properties of linear codes, the resulting updated metadata includes a combination of updated check values for PIM-data and original check values for non-PIM data that match bit-by-bit the check values that would have been generated by the host processor itself had the processor generated the metadata for the modified block of data.

The method of FIG. 2 also includes storing 208 the modified block of data and the updated metadata. In some examples, storing 208 the modified block of data and the updated metadata is carried out by storing the block of data, including the PIM data and the non-PIM data, and storing the updated metadata, including the host-generated metadata and locally-generated metadata, in the memory bank at the particular location from which the block of data and the metadata were loaded.

The method of FIG. 2 also includes, in response to receiving a request to read the modified block of data from the host, transmitting 210 the modified block of data and updated metadata. In some examples, transmitting 210 the modified block of data and updated metadata in response to receiving a request to read the modified block of data from the host is carried out by receiving, by the memory device, a read request from the host processor 212 to read the data in the particular memory location where the modified block of data and the updated metadata are stored, and transmitting the modified block of data and the updated metadata to the host processor 212. A data integrity validation performed by the host processor 212 may include regenerating the metadata and comparing the regenerated metadata to the metadata received from the memory device (i.e., the updated metadata). Because the metadata for the modified portions of data were generated by simulating host-based metadata generation, the host processor 212 will recognize the integrity of the updated metadata as valid.

Figure 3:
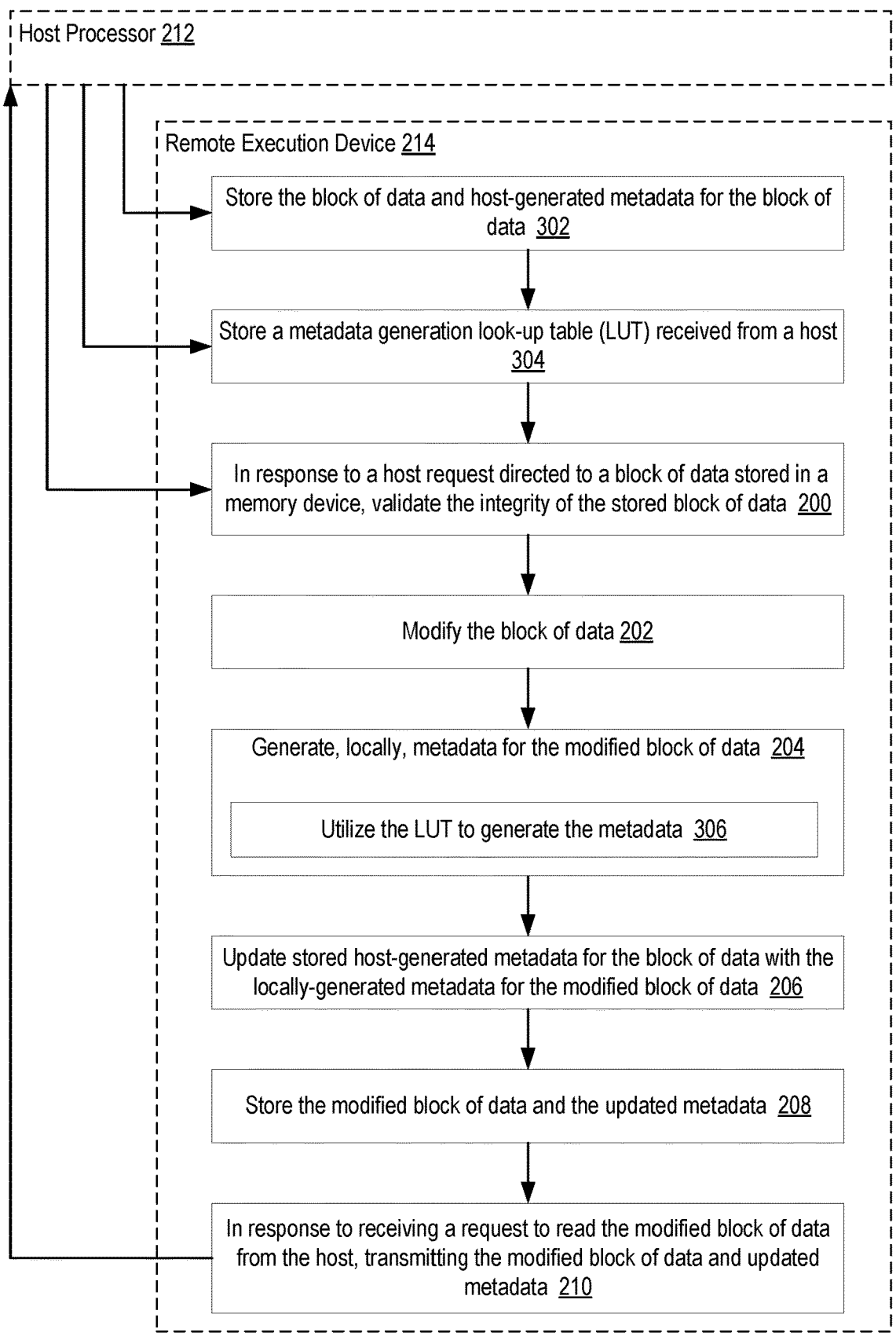
FIG. 3 sets forth a flow chart illustrating another example method of providing host-based error detection capabilities in a remote execution device in accordance with embodiments of the present disclosure.

For further explanation, FIG. 3 sets forth a flow chart illustrating an example method for providing host-based error detection capabilities in a remote execution device in accordance with the present disclosure. Like the example method depicted in FIG. 2, the example method of FIG. 3 also includes, in response to a host request directed to a block of data stored in a memory device, validating 200 the integrity of the stored block of data, modifying 202 the block of data; generating 204, locally, metadata for the modified block of data; updating 206 stored host-generated metadata for the block of data with the locally-generated metadata for the modified block of data; storing 208 the modified block of data and the updated metadata; and transmitting 210 the modified block of data and updated metadata in response to receiving a request to read the modified block of data from the host.

The method of FIG. 3 further includes storing 302 the block of data and host-generated metadata for the block of data. Prior to any modification of the block of data by an operation (e.g., a PIM operation), the block of data is initially stored in the memory device. In some examples, storing 302 the block of data and host-generated metadata for the block of data is carried out by receiving a request to store the block of data at the particular memory location and storing the block of data at the particular memory location in the memory bank. In these examples, the block of data and corresponding metadata are stored together. In one example, the metadata is interleaved in the block of data. In another example, the metadata for the block of data is appended to the block of data.

The method of FIG. 3 also includes storing 304 a metadata generation look-up table (LUT) received from a host. In some examples, storing 304 a metadata generation LUT received from a host is carried out by receiving, by the remote execution device 214, an LUT describing limited information about the host-based metadata generation computation. For example, the LUT may contain the most commonly used bit remainders of a CRC computation. The LUT may be implemented in a reserved storage location (e.g., the LUT storage 126 of FIG. 1) that stores a dictionary of bit positions representing keys and their CRC remainders representing the values. In these examples, the CRC may be computed using the LUT and without replicating the entire CRC calculation logic in the remote execution device 214.

Because the host processor 212 utilizes a linear code such as CRC, metadata generation for the PIM data may utilize the property that crc(a⊕b)=crc(a)⊕crc(b). The addition is over a Galois field of 2 elements indicating an equivalent XOR operation. In some embodiments, the LUT storage is implemented with a static RAM (SRAM) bank where the XOR operation can be performed within the SRAM bank. In other embodiments, the LUT storage is implemented as a flop or latch bank with the XOR operations implemented in separate logic. In some examples, the host processor 212 populates the LUT in the LUT storage through memory mapped instructions or at boot time as a part of the POST sequence.

In the method of FIG. 3, generating 204, locally, metadata for the modified block of data includes utilizing 306 the LUT to generate the metadata. In some examples, the metadata generation unit local to the remote execution device 214 generates error detection metadata (e.g., CRC values) iteratively by traversing the input data word and calculating the error detection metadata using the LUT. Consider an example where an Mbyte block of data is stored with CRC error detection metadata. To emulate host metadata generation for the block of data, for each N byte data word starting with the most significant byte, (a) set a CRC register to '0', (b) XOR the N bytes of data with the CRC register, (c) for each bit set in the N bytes of data, read the LUT to find a bitwise remainder key and XOR the key with the CRC register, and (d) set the CRC register to the value from (c). Upon completion, the contents of the CRC register represent the locally generated metadata for the entire block of data. Readers will appreciate that this computation may be used to update the stored metadata only for the modified portions of the block of data (e.g., as a result of a PIM operation). For example, if only the two most significant bytes of the block of data are modified, only the metadata for those N bytes of data needs to be updated in the stored metadata. Readers will further appreciate that, although a CRC code is used in the above example, the same principle may be applied to any linear error detection code.

In the above example, the LUT has a maximum of M*N entries to store all possible checksums for a CRC lookup. For a 32 byte data word using CRC16, the overhead of such an approach is 0.5 KB of storage per PIM device (where a PIM device may be implemented per-memory channel or per-memory bank). In one implementation, the LUT can support multiple CRC lookups per cycle via either multiple banks or read ports in order to sustain peak execution bandwidth of PIM computations. In another implementation, a hierarchy of LUT storage may be utilized where each memory device channel has a global LUT storage of particular number of entries, and each memory bank (employing PIM) has a local LUT storage with a smaller number of entries. For example, the local LUT storage can be assumed to operate with replacement policies governed by the frequency of data encountered within that bank for PIM data.

Figure 4:
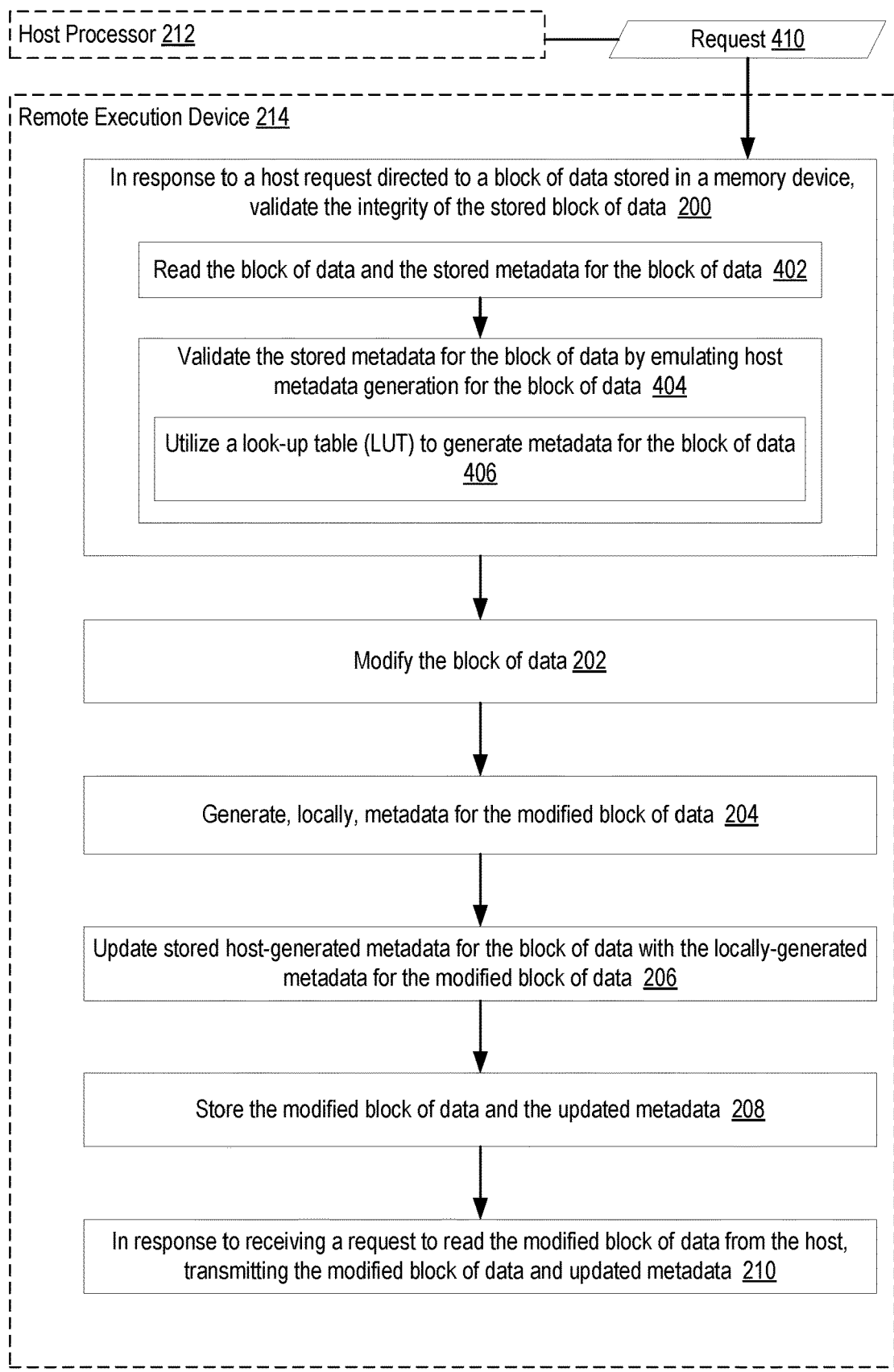
FIG. 4 sets forth a flow chart illustrating another example method of providing host-based error detection capabilities in a remote execution device in accordance with embodiments of the present disclosure.

For further explanation, FIG. 4 sets forth a flow chart illustrating an example method for providing host-based error detection capabilities in a remote execution device in accordance with the present disclosure. Like the example method depicted in FIG. 2, the example method of FIG. 4 also includes in response to a host request directed to a block of data stored in a memory device, validating 200 the integrity of the stored block of data, modifying 202 the block of data; generating 204, locally, metadata for the modified block of data; updating 206 stored host-generated metadata for the block of data with the locally-generated metadata for the modified block of data; storing 208 the modified block of data and the updated metadata; and transmitting 210 the modified block of data and updated metadata in response to receiving a request to read the modified block of data from the host.

In the method of FIG. 4, validating 200 the integrity of the stored block of data includes, in response to receiving a request from the host, reading 402 the block of data and the stored host-generated metadata for the block of data. In some examples, the request is 410 is a PIM request. In these examples, the request 410 requires that data be read from a memory bank prior to performing a PIM operation on the data. In these examples, the stored block of data and metadata are read from the memory bank prior to performing the PIM operation and loaded into a buffer or register. The stored metadata includes host-generated metadata for the block of data. In some cases, if a prior PIM operation has modified the block of data, the stored metadata may also include updated metadata that was generated locally (i.e., in the remote execution device 214).

In method of FIG. 4, validating 200 the integrity of the stored block of data also includes validating 404 the stored host-generated metadata for the block of data by emulating host metadata generation for the block of data. In some examples, validating 404 the stored host-generated metadata for the block of data by emulating host metadata generation for the block of data is carried out by regenerating, in the remote execution device, the metadata for the block of data and comparing the regenerated metadata to the stored metadata. This ensures that the data has not been corrupted prior to performing the operation. In some implementations, validating 404 the stored metadata for the block of data is carried out by the metadata generation unit, while in other implementations "frontend" metadata regeneration and validation prior to performing the operation may be implemented in component that is separate from the metadata generation performed on the "backend" after the operation has completed. Simulating host metadata generation for the block of data may be carried out as described above with respect to a LUT. For example, validating 404 the stored host-generated metadata for the block of data is carried out by the metadata generation unit by utilizing 406 a LUT to locally generate metadata for the block of data. In some implementations, utilizing 406 a LUT to generate metadata the block of data is carried as described above using the LUT storage.

Consider an example where the stored metadata includes CRC codes for a Mbyte block of data. To emulate host metadata generation for the block of data, for each N byte data word starting with the most significant byte, (a) set a CRC register to '0', (b) XOR the N byte of data with the CRC register, (c) for each bit set in the N byte of data, read the LUT in the LUT storage to find a bitwise remainder key and XOR the key with the CRC register, and (d) set the CRC register to the value from (c). Upon completion, the contents of the CRC register represent the locally generated metadata for the entire block of data. The locally generated metadata for the data block is then compared to the stored metadata for the data block to determine whether the data has been corrupted prior to performing the operation.

One major issue of performing metadata generation and validation within the remote execution device, for example, a PIM-enabled memory device, is the potential reduction in memory bandwidth on account of needing additional memory access cycles to perform the metadata generation and validation. The CRC needs to be generated and verified once before the PIM computation (i.e., the frontend), and needs to be regenerated again after the PIM computation (i.e., the backend). This can an add several additional cycles to PIM computations, reducing the overall throughput of PIM computations as it is bottlenecked by the metadata generation and validation. Furthermore, if the host is waiting to access data that PIM operates on, then the memory access latency will be higher. To address this, some implementations may utilize two-tiered metadata validation on the frontend. For example, a fast but low-coverage error detection code may be employed to speed-up the overall frontend validation. A slower but high-coverage code for the metadata validation (e.g., CRC validation) then provides more robust metadata validation. Initial validation using the fast code would allow the PIM operation to proceed while the slower code is actively working to validate the data. For example, the fast code can be a simple interleaved parity code that is able to perform minimal checks on the input data. In such an example, the memory device does not need to wait for metadata generation and validation to complete before executing the PIM operations.

In some examples, if the outcome of the metadata generation and validation disagrees with the outcome of the faster code error detection code, then the current PIM operation is squashed and the data is marked as corrupt. The host system may enforce reactive measures. In these examples, in order to support rollback and recovery, the results of a PIM computation are not stored back to the memory bank or to local registers until metadata generation and validation has verified the integrity of the data. In these examples, the results of a PIM computation are held in a temporary buffer until the frontend validation completes. The temporary buffer may also act as a forwarding layer where subsequent instructions that have dependence on these inflight instructions get their operands sourced directly from this buffer.

In some implementations, where the metadata cannot be recreated, the metadata along with its data can be explicitly marked as being corrupt even though the data is clean. For example, a different signature may be used when marking this data as being corrupt so that the host processor may distinguish between a true error and a pseudo-error cause by not being able to generate the metadata. In the case where the metadata cannot be generated and marked as being corrupt, the data may still be valid. The host processor may take reactive measures on the data for which the metadata was not successfully generated or recreated within the PIM device. In one example, if the host processor determines a corrupted metadata is marked as being PIM data, it can reactively populate the LUT with the checksum of each of the unique N bytes data in that cache line. The host processor may then try to replay the read request to try and see if the memory device can calculate the correct metadata with the recently updated LUT. In another example, a threshold for the number of retries may be allowed before the host processor signals to allow the memory device to perform further action. The data in the memory device for which the metadata cannot be generated with the available entries in the LUT storage should remain present in the memory device (without getting swapped) for a finite amount of time to allow the host processor to populate the LUT storage so the memory device can attempt to compute the metadata.

Figure 5:
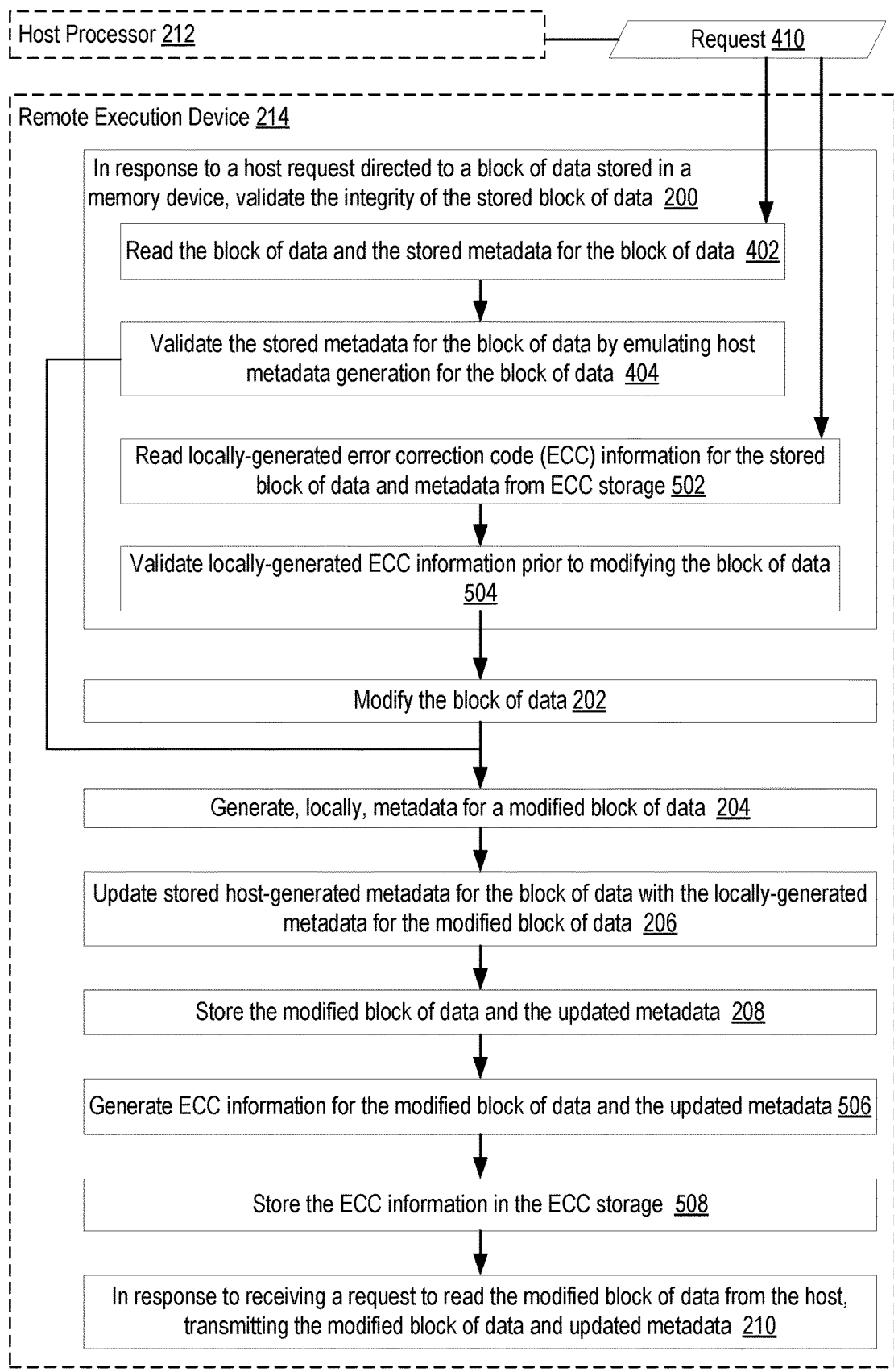
FIG. 5 sets forth a flow chart illustrating another example method of providing host-based error detection capabilities in a remote execution device in accordance with embodiments of the present disclosure.

For further explanation, FIG. 5 sets forth a flow chart illustrating an example method for providing host-based error detection capabilities in a remote execution device in accordance with the present disclosure. Like the example method depicted in FIG. 4, the example method of FIG. 5 also includes validating 200 the integrity of the stored block of data including reading 402 the block of data and the stored metadata for the block of data and validating 404 the stored metadata for the block of data by simulating host metadata generation for the block of data; modifying 202 the block of data; generating 204, locally, metadata for a modified block of data; updating 206 stored host-generated metadata for the block of data with the locally-generated metadata for the modified block of data; storing 208 the modified block of data and the updated metadata; and transmitting 210 the modified block of data and updated metadata in response to receiving a request to read the modified block of data from the host.

The method of FIG. 5 further includes reading 502 locally generated error correction code (ECC) information for the stored block of data and the metadata from ECC storage. In some implementations, the memory device 214 may implement an ECC used by the memory device to validate data read from and written to its own memory banks. The ECC may be generated by an ECC generator/validator (e.g., ECC module 128 in FIG. 1). For example, the ECC information such as checkbits may be stored in ECC storage (e.g., 130). In some examples, locally generated ECC information for the stored block of data and the metadata from ECC storage is carried out by reading ECC information for the stored block of data and the metadata from the checkbit storage.

The method of FIG. 5 also includes validating 504 the locally generated ECC prior to modifying the block of data. In some examples, validating 504 the locally generated ECC prior to modifying the block of data is carried out by computing the ECC for the combined block of data and metadata and comparing the computed ECC to the ECC information read from the checkbit storage. If the computed ECC and the stored ECC match, the local integrity of the stored block of data and the stored metadata is intact.

In an embodiment, the ECC may be employed as the fast code by relying on the coverage provided by the ECC to allow operations to be performed without waiting for the metadata validation to complete. As soon as the ECC validation signals that the data is clean, the operation may proceed. In another embodiment, the ECC validation and metadata validation are performed in parallel. As the access latency is inclusive of the ECC encode/decode, both the ECC and metadata validation can be performed in parallel.

The method of FIG. 5 also includes generating 506 ECC information for the modified block of data and the updated metadata. In some examples, generating 506 ECC information for the modified block of data and the updated metadata is carried out by the ECC generator/validator computing an ECC for the modified block of data and the updated metadata.

The method of FIG. 5 also includes storing 508 the ECC information in ECC storage. In some examples, storing 508 the ECC information in ECC storage is carried out by storing the ECC checkbits for the modified block of data and the updated metadata in the ECC storage.

In some cases, until generation of the updated metadata for the modified block of data has completed, the ECC generator/validator cannot proceed and subsequent requests to data in that corresponding address cannot be serviced. In some implementations, the backend metadata generation for the modified block of data may be omitted for operation sequences that do not write data to memory but store the intermediate results to local registers (e.g., registers 122 in FIG. 1). If the subsequent instruction requires a read access to the same address of the current instruction, then the forwarding network temporary buffer may provide the data. In this case, the ECC validation and metadata validation in the frontend may be bypassed as this data forwarding happens. If the subsequent instruction requires a write access to the same address or any access to any other address, the memory device waits for the computation and the backend metadata generation process to complete. If the subsequent instructions only source data from local registers, then these instructions may proceed. Once the metadata generation in the backend is completed, the data is removed from the temporary buffer to make space for new data.

In some implementations, the backend metadata generation is fully pipelined and can sustain peak operation execution provided there is enough buffering to hold the modified data along with their partially generated metadata. Throughput will be reduced if dependent operations are scheduled on the device while the metadata is being calculated.

In some implementations, metadata generation is expedited on the backend by generating the mask of bytes that have changed because of the operation and only generate the metadata for that data. If only a part of the data is modified, then the metadata for that part of the modified data is generated by the suggested LUT algorithm. By XOR'ing this output with the original data, the metadata of the PIM computed data can be generated. The overhead of such an approach can be between O1 to O(n) where 'n' is the number of bytes modified.

In view of the foregoing disclosure, readers will appreciate that, by using hints for error detection metadata generation provided by the host, a remote execution device such as a PIM device can 1) validate metadata generated by the host prior performing remote execution operations and 2) generate error detection metadata for data modified by remote execution operations in a manner that emulates a host-based metadata generation function, without copying the host-based metadata generation logic to the remote execution device. Readers will also appreciate that a fast code, such as in-memory ECC computation, may be utilized to initially validate the integrity of stored data to allow the remote execution operation to execute while metadata for stored data is regenerated and validated against stored metadata. The ECC validation and metadata regeneration/validation may be carried out in parallel to improve performance. Readers will also appreciate that upon validation of the stored metadata, the result of a remote execution operation may be stored in a temporary buffer and made available to other remote execution operations that use the result while metadata is generated for the modified data. The error detection metadata for the modified data may be generated piecemeal, in that updated metadata is created only for the modified portion of data without generating metadata for the unmodified portion of the data. Accordingly, when a host reads data that was updated by a remote execution operation and metadata that was updated in the memory device using the metadata generation hints, the host will not distinguish between metadata that was created by the host and metadata that was generated in memory.

Embodiments can be a system, an apparatus, a method, and/or logic circuitry. Computer readable program instructions in the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. In some embodiments, electronic circuitry including, for example, programmable logic circuitry, field-programmable gate arrays (FPGA), or programmable logic arrays (PLA) may execute the computer readable program instructions by utilizing state information of the computer readable program instructions.

Aspects of the present disclosure are described herein with reference to flowchart illustrations and/or block diagrams of methods, apparatus (systems), and logic circuitry according to some embodiments of the disclosure. It will be understood that each block of the flowchart illustrations and/or block diagrams, and combinations of blocks in the flowchart illustrations and/or block diagrams, can be implemented by logic circuitry.

The logic circuitry may be implemented in a processor, other programmable data processing apparatus, or other device to cause a series of operational steps to be performed on the processor, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and logic circuitry according to various embodiments of the present disclosure. In this regard, each block in the flowchart or block diagrams may represent a module, segment, or portion of instructions, which includes one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts or carry out combinations of special purpose hardware and computer instructions.

While the present disclosure has been particularly shown and described with reference to embodiments thereof, it will be understood that various changes in form and details may be made therein without departing from the spirit and scope of the following claims. Therefore, the embodiments described herein should be considered in a descriptive sense only and not for purposes of limitation. The present disclosure is defined not by the detailed description but by the appended claims, and all differences within the scope will be construed as being included in the present disclosure.

What is claimed is:

1. A method of providing host-based error detection capabilities in a remote execution device, the method comprising:
    modifying a block of data;
    in response to the modification, locally generating error detection metadata for the modified block of data using one or more values associated with a metadata generation technique of a host device without using the technique; and
    updating host-generated error detection metadata for the block of data with the locally-generated error detection metadata.

2. The method of claim 1 further comprising:
    storing the modified block of data and the updated error detection metadata; and
    in response to receiving a request to read the modified block of data from the host, transmitting the modified block of data and updated error detection metadata.

3. The method of claim 1, further comprising:
    storing the block of data and host-generated error detection metadata; and
    storing a metadata generation look-up table (LUT) received from the host;
    wherein generating, locally, error detection metadata for the modified block of data includes utilizing the LUT to generate the error detection metadata for the block of data.

4. The method of claim 1 further comprising:
    in response to receiving a request from the host, reading the block of data and the host-generated error detection metadata for the block of data; and
    validating the host-generated error detection metadata for the block of data by emulating a host error detection metadata generation technique for the block of data.

5. The method of claim 4, wherein emulating the host error detection metadata generation technique for the block of data includes utilizing a look-up table (LUT) to locally generate metadata for the block of data.

6. The method of claim 5, wherein the block of data is modified without waiting for validation of the host-generated error detection metadata for the block of data to complete.

7. The method of claim 4 further comprising:
    reading a locally generated error correction code (ECC) for the block of data and metadata from ECC storage; and
    validating the locally generated ECC prior to modifying the block of data.

8. The method of claim 7 further comprising:
    generating ECC information for the modified block of data and the updated metadata; and
    storing the ECC information in the ECC storage.

9. The method of claim 1, wherein modifying the block of data includes modifying, by a processing-in-memory (PIM) device, the block of data.

10. An apparatus comprising:
    a memory device; and
    a processing-in-memory (PIM) device coupled to the memory device, wherein the PIM device is configured to:
    modifying a block of data;
    in response to the modification, locally generating error detection metadata for the modified block of data using one or more values associated with a metadata generation technique of a host device without using the technique; and
    updating host-generated error detection metadata for the block of data with the locally-generated error detection metadata.

11. The apparatus of claim 10, wherein the PIM device is further configured to:
    store the block of data and host-generated error detection metadata for the block of data; and
    store a metadata generation look-up table (LUT) received from the host;
    wherein generating, locally, metadata for the modified block of data includes utilizing the LUT to generate metadata.

12. The apparatus of claim 10, wherein the PIM device is further configured to:
    in response to receiving a PIM request from the host, read the block of data and the host-generated error detection metadata for the block of data; and
    validate the host-generated error detection metadata for the block of data by emulating a host error detection metadata generation technique for the block of data.

13. The apparatus of claim 12, wherein emulating the host error detection metadata generation technique for the block of data includes utilizing a look-up table (LUT) to locally generate metadata for the block of data.

14. The apparatus of claim 12, wherein the PIM device is further configured to:
    read a locally generated error correction code (ECC) for the block of data and metadata from ECC storage; and
    validate the locally generated ECC prior to modifying the block of data.

15. The apparatus of claim 14, wherein the PIM device is further configured to:

generate ECC information for the modified block of data and the updated metadata; and store the ECC information in the ECC storage.

16. A system comprising:

a host processor device; and a memory device coupled to the host processor device, wherein the memory device is configured to:

modify a block of data;

in response to the modification, locally generate error detection metadata for the modified block of data using one or more values associated with a metadata generation technique of a host device without using the technique; and update host-generated error detection metadata for the block of data with the locally-generated error detection metadata.

17. The system of claim 16, wherein the memory device is further configured to:

store the block of data and host-generated error detection metadata; and storing a metadata generation look-up table (LUT) received from the host processor device;

wherein generating, locally, error detection metadata for the modified block of data includes utilizing the LUT to generate the error detection metadata.

18. The system of claim 16, wherein the memory device is further configured to:

in response to receiving a PIM request from the host processor device, read the block of data and the host-generated error detection metadata for the block of data; and validate the host-generated error detection metadata for the block of data by emulating a host error detection metadata generation technique for the block of data.

19. The system of claim 18, wherein emulating the host error detection metadata generation technique for the block of data includes utilizing a look-up table (LUT) to locally generate metadata for the block of data.

20. The system of claim 18, wherein the memory device is further configured to:

read a locally generated error correction code (ECC) for the block of data and metadata from ECC storage; and validate the locally generated ECC prior to modifying the block of data.

* * * * *